(12) United States Patent
Maki et al.

(10) Patent No.: US 8,781,264 B2
(45) Date of Patent: Jul. 15, 2014

(54) OPTICAL PULSE TEST APPARATUS AND METHOD OF TESTING OPTICAL TRANSMISSION PATH

(75) Inventors: Tatsuyuki Maki, Atsugi (JP); Osamu Yamashita, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 352 days.

(21) Appl. No.: 13/197,286

(22) Filed: Aug. 3, 2011

(65) Prior Publication Data

US 2012/0038909 A1 Feb. 16, 2012

(30) Foreign Application Priority Data

Aug. 13, 2010 (JP) .................................. 2010-181282

(51) Int. Cl.
*G02B 6/00* (2006.01)
*G02B 6/26* (2006.01)
*G02B 6/42* (2006.01)
*G02B 6/02* (2006.01)
*G02B 6/028* (2006.01)

(52) U.S. Cl.
CPC .............. *G02B 6/02357* (2013.01); *G02B 6/02* (2013.01); *G02B 6/02333* (2013.01); *G02B 6/02009* (2013.01); *G02B 6/0288* (2013.01); *G02B 6/02023* (2013.01)
USPC ............................... 385/12; 356/73.1; 385/28

(58) Field of Classification Search
CPC .. G02B 6/02; G02B 6/02357; G02B 6/02333; G02B 6/02009; G02B 6/0288; G02B 6/02023
USPC ...................... 359/73.1; 385/12, 28; 356/73.1
See application file for complete search history.

(56) References Cited

U.S. PATENT DOCUMENTS 5,528,356 A 6/1996 Harcourt

FOREIGN PATENT DOCUMENTS

JP 1988-142230 A 6/1988
JP 02-002907 A 1/1990
JP 06-167418 A 6/1994

OTHER PUBLICATIONS

Machine translation of Okamoto et al. (JP 06-167418).*

* cited by examiner

*Primary Examiner* — Ryan Lepisto
*Assistant Examiner* — Erin Chiem
(74) *Attorney, Agent, or Firm* — Pearne & Gordon LLP

(57) ABSTRACT

[Task] To enable a test of an optical transmission path using an MMF with a simple configuration in an optical pulse test apparatus which is used for an SFM for long-distance transmission.
[Means for Resolution] An optical coupler 22, a light source 21, a connector 23, and an optical receiver 25 are respectively connected to each other by SMF optical paths Fa to Fc. A signal processing unit 30 includes fiber type designation means 31*a* for designating the type of an optical fiber of a test-target optical transmission path 1 as either an SMF or an MMF, SMF parameter designation means 31*b* for, when an SMF is designated, designating test parameters including the refractive index of the SMF, and MMF parameter designation means 31*c* for, when an MMF is designated, designating test parameters including the refractive index of the MMF. The transmission characteristic of the optical transmission path 1 using the designated optical fiber with respect to distance is obtained on the basis of the parameters including the refractive index of the designated optical fiber and intensity data of return light Pr and displayed on a display unit 50.

2 Claims, 4 Drawing Sheets

CHARACTERISTIC (CONNECTOR PORTION) OF DISTANCE 0

OPTICAL PULSE TEST APPARATUS AND METHOD OF TESTING OPTICAL TRANSMISSION PATH

TECHNICAL FIELD

The present invention relates to an optical pulse test apparatus which enters an optical pulse into an optical transmission path having a test-target optical fiber and receives return light to test the optical transmission path. In particular, the present invention relates to a technique capable of testing a test-target optical transmission path without changing hardware including an optical system, regardless of whether the type of a fiber is a single-mode fiber (SMF) or a multimode fiber (MMF).

BACKGROUND ART

As an optical fiber which forms an optical transmission path, there are an SMF which has small transmission loss and is suitable for long-distance transmission and an MMF which has comparatively large transmission loss but is inexpensive and suitable for short-distance transmission.

An optical fiber has a coaxial structure in which a clad portion having a smaller refractive index surrounds the periphery of a core portion. In the optical fiber, light which enters the core portion is reflected (refracted) from the boundary portion between the core portion and the clad portion and propagates in the length direction. An SMF has a minute (in general, 9.2 µm) core such that there is a single propagation mode (passage) when passing through the core portion, and an MMF has a thick core (in general, 50 µm, 62.5 µm) such that there are a plurality of propagation modes.

As shown in FIG. 5, an optical pulse test apparatus which tests a transmission path formed by an optical fiber provides an optical pulse Pin emitted from a light source 11 to a connector 13 through an optical coupler 12. The optical pulse Pin enters a test-target optical transmission path 1 connected to the connector 13, and return light (backward-scattered light or Fresnel reflected light) Pr from the optical transmission path 1 enters an optical receiver 14 through the connector 13 and the optical coupler 12. Data regarding the intensity of return light Pr received by the optical receiver 14 from the entering timing of the optical pulse Pin is continuously acquired for a given time, and the presence/absence of the occurrence of failure in the optical transmission path 1, or the like from acquired data is examined.

As described above, with regard to the optical fiber which forms the optical transmission path 1, an SMF is used for long-distance transmission, and an MMF is used for short-distance transmission. In the optical pulse test apparatus of the related art, however, it is not possible to test an optical transmission path using an SMF and an optical transmission path using an MMF by a single test apparatus due to a difference in the core diameter.

For example, in the case of an optical pulse test apparatus for SMF measurement, a connection portion of the connector 13 to the core of the optical fiber is designed for the core diameter of the SMF. When an MMF having a significantly thick core diameter is connected to the connector 13, an optical pulse enters from a small core diameter to a large core diameter, such that a large loss does not occur. Meanwhile, with regard to return light from the MMF, return light enters from a large core diameter to a small core diameter, such that a considerable loss occurs.

To the contrary, in the case of an optical pulse test apparatus for MMF measurement, a connection portion of the connector 13 to the core of the optical fiber is designed for the core diameter of the MMF. For this reason, if a SMF having a significantly fine core diameter is connected to the connector 13, a considerable loss occurs when an optical pulse enters the SMF.

As a technique for solving this type of problem, in an optical pulse test apparatus for MMF measurement, a technique is known in which outgoing light is excited in a low-order mode, thereby reducing a loss when light enters from the MMF to the SMF. The polarization of outgoing light is changed to prevent fluctuation in the light reception intensity due to the polarization dependency of an optical path conversion element (corresponding to the optical coupler 12) (for example, Patent Document 1).

RELATED ART DOCUMENT

Patent Document

[Patent Document 1] JP-A-63-142230

SUMMARY OF THE INVENTION

Problem that the Invention is to Solve

However, the above-described technique basically adds an SMF test function to an optical pulse test apparatus for an MMF, and is not sufficient in terms of the precision of an SMF failure test for long-distance transmission which is severely damaged due to a fault.

A structure is made in which mechanical force is continuously provided to the fiber in the test apparatus. Accordingly, the structure is complicated and there is a problem regarding durability.

The invention has been finalized in consideration of this situation, and an object of the invention is to provide an optical pulse test apparatus which is used for an SMF for long-distance transmission and can test an optical transmission path using an MMF with a simple configuration, and a method of testing an optical transmission path.

Means for Solving the Problem

In order to achieve the above-described object, a first aspect of the invention provides an optical pulse test apparatus. The optical pulse test apparatus includes a light source which emits an optical pulse, a connector to which a test-target optical transmission path of an optical fiber is connected, an optical receiver, an optical coupler which receives the optical pulse emitted from the light source, emits the optical pulse to the connector, receives return light from the optical fiber through the connector, and enters return light into the optical receiver, an operation unit, a display unit, and a signal processing unit which receives an output of the optical receiver, continuously acquires data regarding the intensity of the return light entering the optical receiver, obtains the transmission characteristic of the test-target optical fiber with respect to distance on the basis of data and test parameters designated by the operation unit, and displays the transmission characteristic on the display unit. The light source and the optical coupler, the optical coupler and the connector, and the optical coupler and the optical receiver are respectively connected to each other by optical paths (Fa to Fc) using a single-mode fiber. The signal processing unit includes fiber type designation means for designating, based on the test parameters, the type of the test-target optical fiber as either a single-mode fiber or a multimode fiber, SMF parameter designation means for, when a single-mode fiber is designated by the fiber type designation means, designating parameters including the refractive index of the single-mode fiber, the parameters being necessary for testing an optical transmission path using the single-mode fiber, and MMF parameter designation means for, when a multimode fiber is designated by the fiber type designation means, designating parameters including the refractive index of the multimode fiber, the parameters being necessary for testing an optical transmission path using the multimode fiber. When the single-mode fiber is designated, the transmission characteristic of the optical fiber with respect to distance is obtained on the basis of intensity data of return light and the parameters including the refractive index designated by the SMF parameter designation means, and when the multimode fiber is designated, the transmission characteristic of the optical fiber with respect to distance is obtained on the basis of intensity data of return light and the parameters including the refractive index designated by the MMF parameter designation means.

According to a second aspect of the invention, in the optical pulse test apparatus according to the first aspect of the invention, the signal processing unit may include connection confirmation means for obtaining a connection loss of the test-target optical fiber to the connector and determining whether or not the connection loss is within an allowable range set in advance, and allowable range shift means for shifting the allowable range to be used for the determination by the connection confirmation means in accordance with a difference of an optical fiber designated by the fiber type designation means.

A third aspect of the invention provides a method of testing an optical transmission path. The method includes the steps of connecting a test-target optical transmission path of an optical fiber, designating test parameters corresponding to the optical fiber, emitting an optical pulse to the optical fiber, receiving return light from the optical fiber, continuously acquiring intensity data of the return light, and obtaining and displaying the transmission characteristic of the optical fiber with respect to distance on the basis of intensity data and the test parameters. In the step of emitting the optical pulse, the optical pulse is emitted to the optical fiber through an optical path using a single-mode fiber. In the step of receiving return light, return light is received through the optical path using the single-mode fiber. The step of designating the test parameters includes the steps of designating, based on the test parameters, the type of an optical fiber of the optical transmission path as either a single-mode fiber or a multimode fiber, when a single-mode fiber is designated as the type of the optical fiber, designating parameters including the refractive index of the single-mode fiber, the parameters being necessary for testing an optical transmission path using the single-mode fiber, and when a multimode fiber is designated as the type of the optical fiber, designating parameters including the refractive index of the multimode fiber, the parameters being necessary for testing an optical transmission path using the multimode fiber. In the step of displaying the transmission characteristic, when the single-mode fiber is designated, the transmission characteristic of the optical fiber with respect to distance is obtained on the basis of intensity data of return light and the parameters including the designated refractive index necessary for testing the single-mode fiber and is displayed, and when the multimode fiber is designated, the transmission characteristic of the optical fiber with respect to distance is obtained on the basis of intensity data of return light and the parameters including the designated refractive index necessary for testing the multimode fiber and is displayed.

According to a fourth aspect of the invention, in the method of testing an optical transmission path according to the third aspect of the invention, the step of displaying the transmission characteristic may include the steps of obtaining a connection loss at a connection portion of the optical fiber and determining whether or not the connection loss is within an allowable range set in advance, and shifting the allowable range to be used for the determination in accordance with a difference of the designated optical fiber.

Advantage of the Invention

As described above, according to the optical pulse test apparatus and the method of testing an optical transmission path of the invention, when a single-mode fiber is designated as a fiber which forms the test-target optical transmission path, light propagates in a single mode over the entire optical path from the light source to the optical transmission path, thereby accurately detecting a failure in a long-distance transmission path. Even when a multimode fiber is designated as a fiber which forms the test-target optical transmission path, parameters including the refractive index of the multimode fiber necessary for a test can be set exclusively, thereby testing an optical transmission path using a multimode fiber without hardware switching.

Even when a connection abnormality in the connection portion of the optical transmission path is examined, the allowable range as the determination criterion of connection confirmation is shifted in accordance with the type of the designated fiber, thereby correctly determining a connection abnormality of the optical transmission path regardless of loss due to a difference in the core diameter.

MODE FOR CARRYING OUT THE INVENTION

Figure 1:
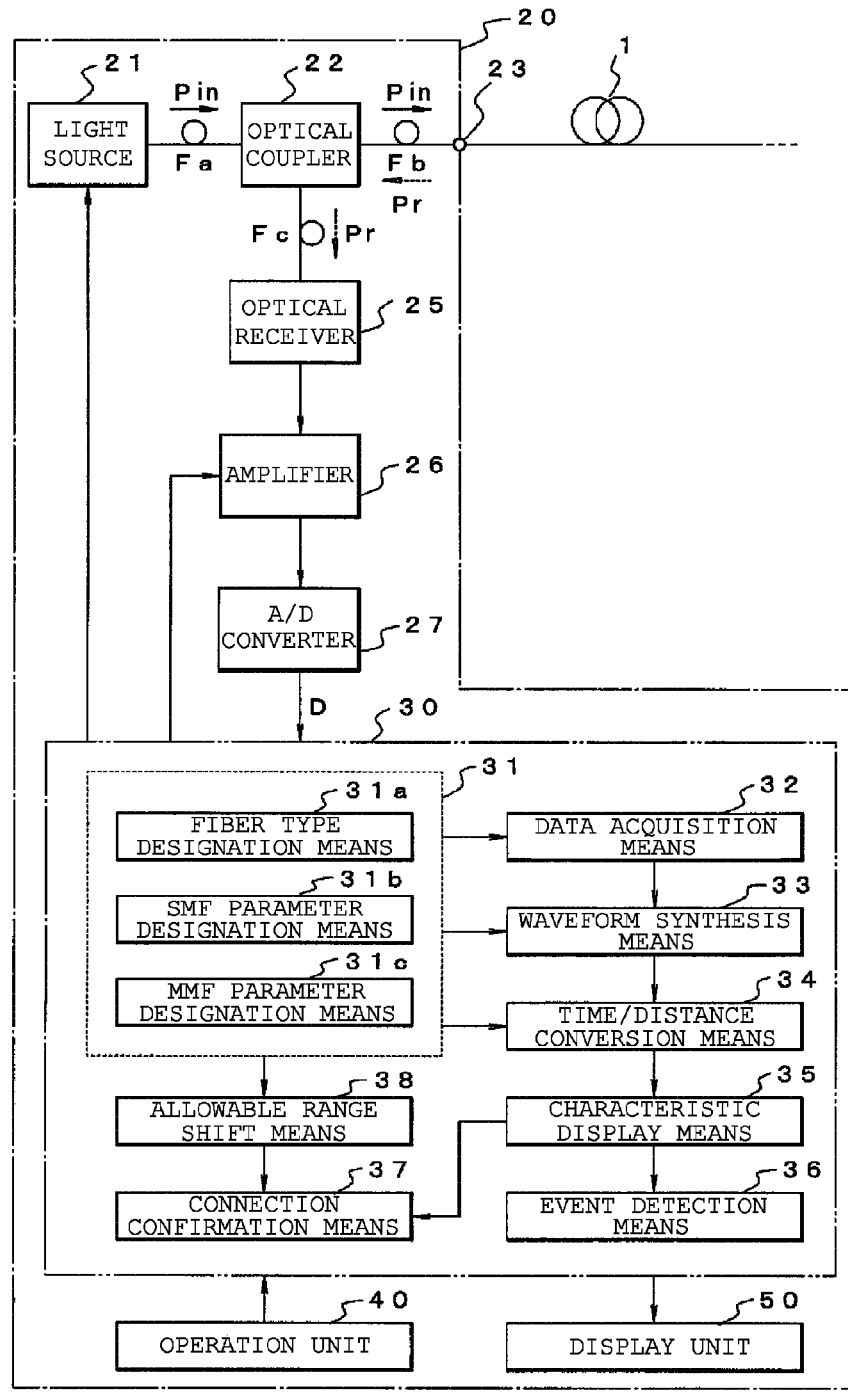
FIG. 1 is an overall configuration diagram of an embodiment of the invention.

Hereinafter, an embodiment of the invention will be described with reference to the drawings.
FIG. 1 is an overall configuration diagram of an optical pulse test apparatus 20 to which the invention is applied.
As shown in FIG. 1, the optical pulse test apparatus 20 emits an optical pulse Pin for a test having a predetermined wavelength (for example, 1550 μm) and a predetermined pulse width at a predetermined period from, for example, a light source 21 which has a semiconductor laser. The timing and period at which the light source 21 emits the optical pulse Pin, and the pulse width of the optical pulse Pin are set by a signal processing unit 30 described below.
The optical pulse Pin enters an optical coupler 22 through an SMF optical path Fa using a single-mode fiber (SMF).
The optical coupler 22 receives the optical pulse Pin emitted from the light source 21, emits the optical pulse Pin to a connector 23 through an SMF optical path Fb, and enters the optical pulse Pin into the test-target optical transmission path 1 connected to the connector 23. The optical coupler 22 receives return light Pr (Fresnel reflected light or backward-scattered light) from the optical transmission path 1 with respect to the optical pulse Pin through the connector 23 and the SMF optical path Fb, emits return light Pr in a direction different from the direction in which the optical pulse Pin enters, and enters return light Pr into an optical receiver 25 through an SMF optical path Fc.

An output signal of the optical receiver 25 is amplified by an amplifier 26, input to an A/D converter 27, sampled in a predetermined sampling period, and converted to a digital data value D. The digital data value D is input to the signal processing unit 30.

The signal processing unit 30 continuously acquires data D regarding the intensity of return light Pr entering the optical receiver 25 for a given time from the timing at which the optical pulse Pin is emitted from the light source 21 and stores data D in a memory (not shown). The signal processing unit 30 obtains the transmission characteristic of the test-target optical transmission path 1 on the basis of a sequence of stored data D and test parameters designated in advance by an operation unit 40, and displays the transmission characteristic on a display unit 50.

The signal processing unit 30 includes test condition setting means 31, data acquisition means 32, waveform synthesis means 33, time/distance conversion means 34, characteristic display means 35, event detection means 36, connection confirmation means 37, and allowable range shift means 38.

The test condition setting means 31 allows a user to set information (a measurement-target fiber type or immediately necessary parameters) necessary for a test by operating the operation unit 40, and includes fiber type designation means 31a, SMF parameter designation means 31b, and MMF parameter designation means 31c.

The fiber type designation means 31a designates the type of an optical fiber of the test-target optical transmission path 1 as either a single-mode fiber (SMF) or a multimode fiber (MMF).

When an SMF is designated by the fiber type designation means 31a, the SMF parameter designation means 31b designates parameters including the refractive index of the SMF necessary for testing an optical transmission path using an SMF. Similarly, when an MMF is designated by the fiber type designation means 31a, the MMF parameter designation means 31c designates parameters including the refractive index of the MMF necessary for testing an optical transmission path using an MMF.

Examples of the parameters include the refractive index of a fiber, the standard value of a fiber loss per unit distance, the threshold value (event loss) of a loss for determining the presence/absence of failure in a transmission path or the like, the allowable range of a loss for determining the presence/absence of a connection abnormality at the connector 23, and a loss amount ΔL caused by a difference in the core diameter between the SMF and the MMF.

The data acquisition means 32 stores data D sampled by the A/D converter 27 in the memory (not shown) from the timing at which the optical pulse Pin is emitted until a given time elapses. With regard to data acquisition, the optical pulse is output multiple times while varying the gain of the amplifier 26 in a stepwise manner.

That is, when the intensity ratio of strong return light from the near end of the measurement-target optical transmission path 1 to weak return light from the far end is large (for example, equal to or greater than 10000 times), and the output dynamic range of the ten-bit A/D converter 27 is, for example, about 1000 times, this cannot be resolved by a single range.

Figure 2:
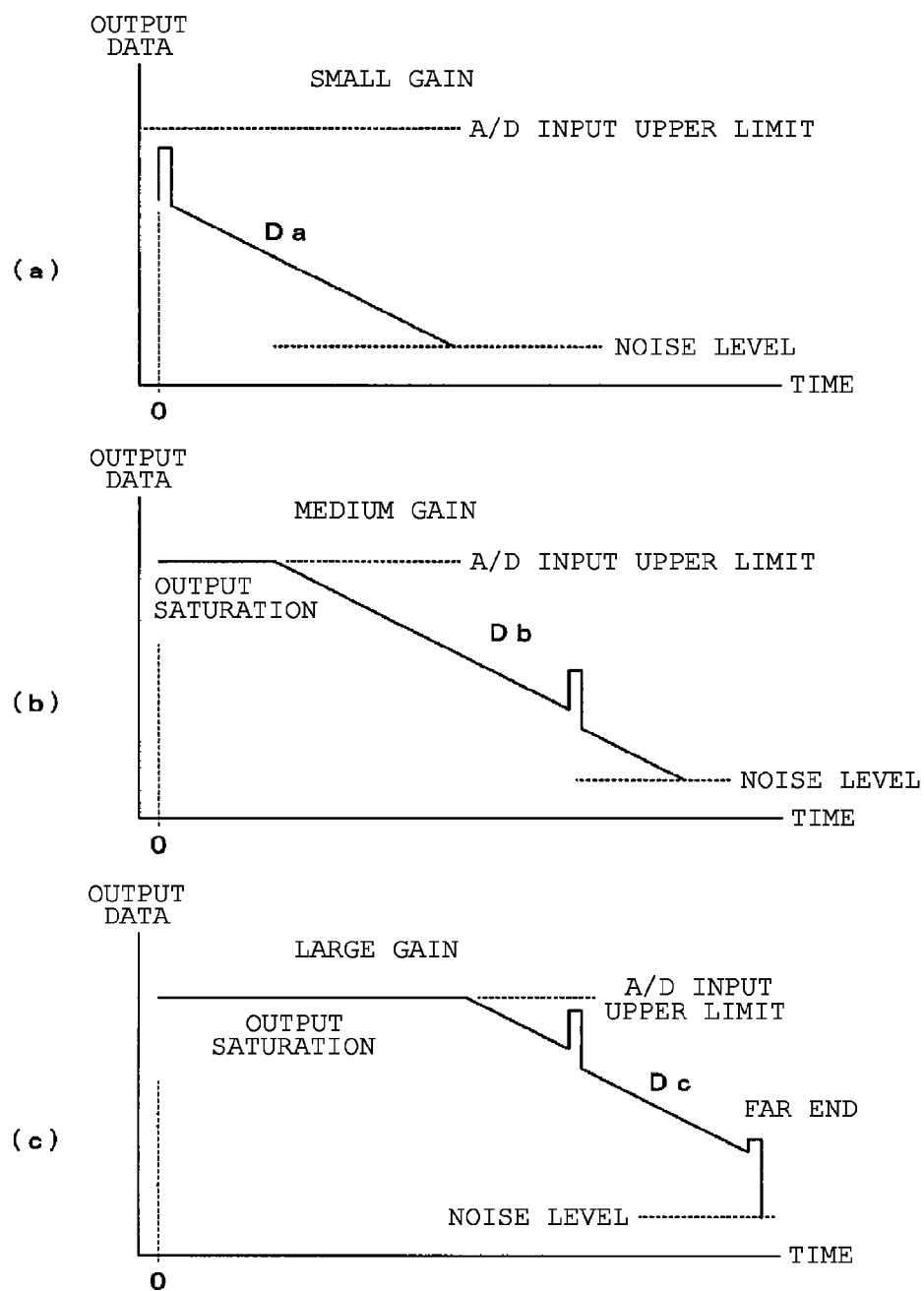
FIGS. 2A to 2C are diagrams illustrating a data acquisition method of the embodiment.

For this reason, for example, when correctly obtaining data regarding strong return light from a nearby region, the output of the A/D converter 27 is continuously acquired from when the optical pulse enters until a given time elapses in a state where the input-side gain of the A/D converter 27 is lowered (for example, 3 dB). FIG. 2A shows a state where data Da of the nearby region is in the input range of the A/D converter 27 but is not buried in noise.

When correctly obtaining data regarding return light from an intermediate region, the output of the A/D converter 27 is acquired from when the optical pulse enters until a given time elapses in a state where the input-side gain of the A/D converter 27 slightly increases (for example, 13 dB). FIG. 2B shows a state where data Db of the intermediate region is in the input range of the A/D converter 27 but is not buried in noise.

When correctly obtaining data regarding weak return light from a far-end region, the output of the A/D converter 27 is acquired from when the optical pulse enters until a given time elapses in a state where the input-side gain of the A/D converter 27 further increases (for example, 23 dB). FIG. 2C shows a state where data Dc of the far-end region is in the input range of the A/D converter 27 but is not buried in noise.

Although in this example, for ease of understanding, there are three steps, the gain may be varied using more steps. In practice, from the viewpoint of data averaging, data acquisition is performed multiple times for each gain.

After each piece of waveform data is obtained for each gain in the above-described manner, the waveform synthesis means 33 extracts correct data from waveform data by excluding incorrect data which becomes saturated or buried in noise, corrects the gain amount (also carries out logarithmic transformation with respect to the level axis), and combines to synthesize the gain-corrected waveform on the time axis from the near end to the far end.

Since the synthesized waveform as a transmission characteristic is defined on the time axis, it is necessary to convert the time axis to the distance axis to specify the failure occurrence position.

That is, if the light speed is c (m/second), the time from when the optical pulse is emitted is t (second), and the refractive index of the optical transmission path 1 (optical fiber) is IOR, the distance necessary for characteristic indication is expressed by a conversion expression c×t/(2×IOR).

The time/distance conversion means 34 provides the refractive index designated by the SMF parameter designation means 31b or the MMF parameter designation means 31c to the conversion expression to obtain the correct distance axis of the characteristic waveform for an optical transmission path using any fiber.

Figure 3:
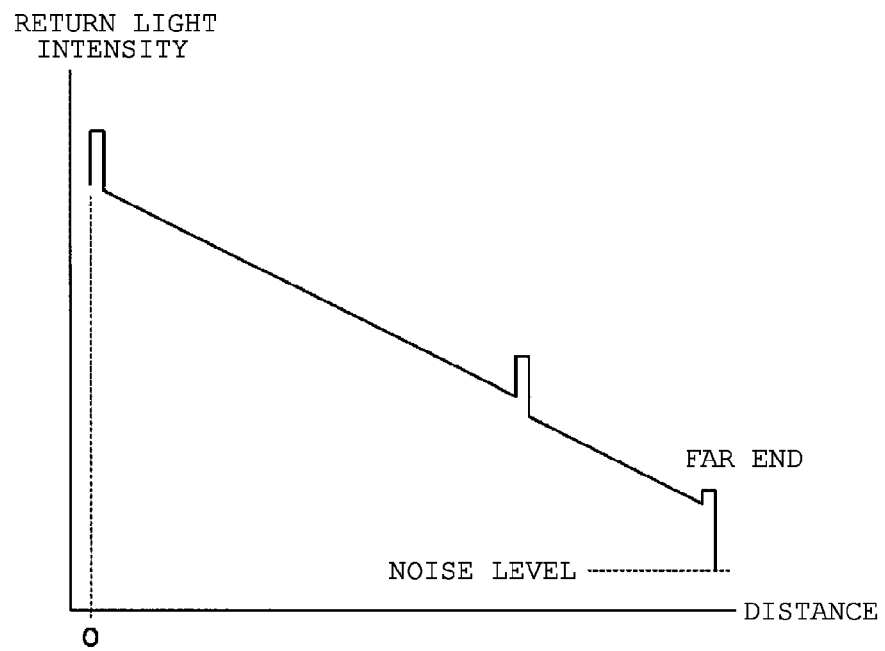
FIG. 3 is a diagram showing an example of a display waveform of a measurement result of the embodiment.

As shown in FIG. 3, the characteristic display means 35 displays the characteristic of the test-target optical transmission path 1 on the screen of the display unit 50 on the basis of the synthesized waveform and converted distance information.

The event detection means 36 detects a position where a loss exceeding an event loss designated in advance (a position where the difference between previous and subsequent pieces of data exceeds a threshold value) from data of the characteristic waveform obtained in the above-described manner, identifiably displays the position, for example, on the characteristic waveform, and marks the loss in association with an event position (a position where the intensity of return light increases due to Fresnel reflection other than a loss may be detected as an event).

Figure 4:
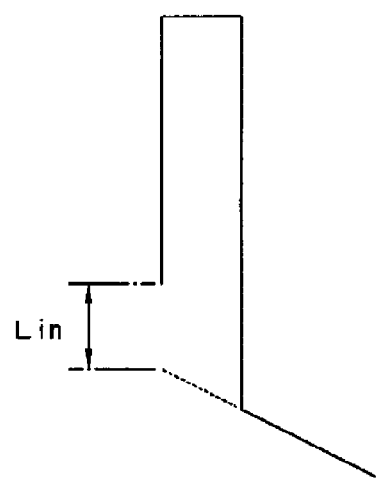
FIG. 4 is a diagram showing loss in a connector portion.
Figure 5:
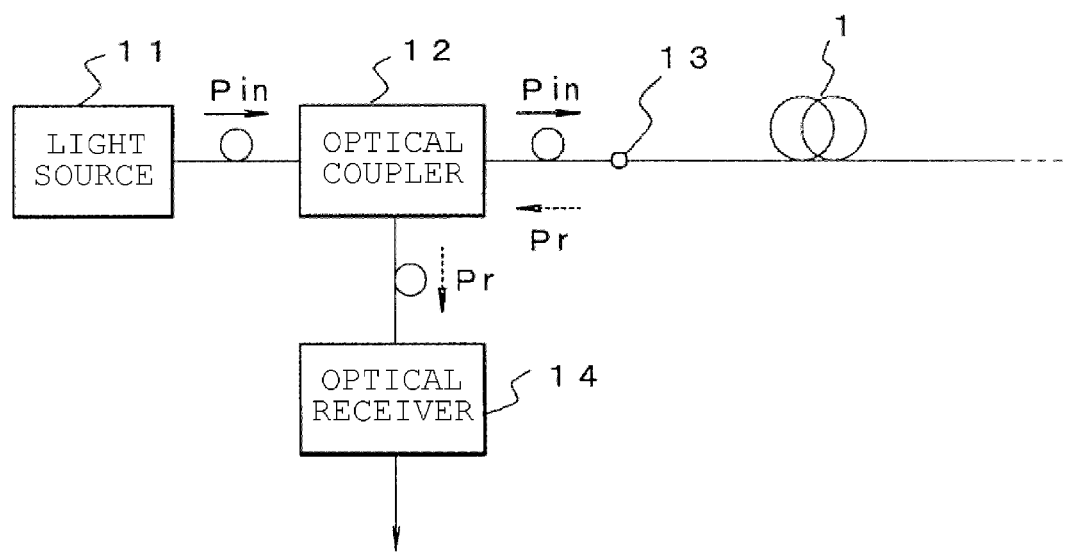
FIG. 5 is a basic configuration diagram of an optical pulse test apparatus.

The connection confirmation means 37 examines whether the test-target optical transmission path 1 is correctly connected to the connector 23. As shown in FIG. 4, the connection confirmation means 37 examines a loss Lin of the characteristic waveform at the input terminal, determines whether or not the loss Lin is within an allowable range designated in advance, and when the loss Lin is outside the allowable range, displays alarm information on the display unit 50 to notify the user that the loss Lin is outside the allowable range.

The allowable range to be used for the determination by the connection confirmation means 37 is included in the parameters designated in the test condition setting means 31. An optical path from the light source 21 to the connector 23 is formed of an SMF. For this reason, when a transmission path using an SMF is designated as a test target, a small loss occurs in the connection portion, and the allowable range can be set centering on a comparatively small value. Meanwhile, when a transmission path using an MMF is designated as a test target, a considerable loss occurs in the connection portion due to a difference in the core diameter.

The allowable range shift means 38 shifts the allowable range, which is used by the connection confirmation means 37 when an MMF is designated, by a loss value ΔL due to a difference in the core diameter between the SMF and the MMF so as to cope with a loss due to a difference of the fiber. With regard to the loss value ΔL, a loss value due to a difference in the core diameter between the SMF and the MMF is initially set and can be variably set by the user.

With this configuration, the optical pulse test apparatus 20 of the embodiment can correctly detect failure in a long-distance transmission path by propagating light in a single mode when the test-target optical transmission path 1 is formed of an SMF. Even when the test-target optical transmission path 1 is formed of an MMF, the optical pulse test apparatus can exclusively set the test parameters including the refractive index of the MMF. Therefore, it is possible to perform a test of the optical transmission path using the MMF without changing hardware including an optical system.

When a connection abnormality to the connector 23 is examined by the connection confirmation means 37, the allowable range as the determination criterion of connection confirmation is shifted in accordance with the type of the fiber to be designated. Therefore, even when there is a loss due to a difference in the core diameter, it is possible to correctly determine a connection abnormality to the connector.

As will be apparent from the above description, a method of testing an optical transmission path in the optical pulse test apparatus 20 includes a step of connecting the test-target optical transmission path 1 to the connector 23, a step of designating the test parameters corresponding to the optical transmission path 1 by the test condition setting means 31, a step of emitting the optical pulse Pin to the optical transmission path 1, a step of receiving return light Pr from the optical transmission path 1, a step of continuously acquiring intensity data D of return light Pr from the timing at which the optical pulse Pin is emitted, and a step of obtaining and displaying the transmission characteristic of the optical transmission path 1 with respect to distance on the basis of acquired intensity data and the test parameters. The optical pulse Pin is emitted to the optical transmission path 1 through the optical path (Fa, Fb) using a single-mode fiber, and return light Pr is received through the optical path (Fb, Fc) using a single-mode fiber. It is basically appropriate for testing an optical transmission path using a single-mode fiber.

In the step of designating the parameters, the type of an optical fiber of the optical transmission path 1 is designated as either a single-mode fiber or a multimode fiber by the fiber type designation means 31a. When a single-mode fiber is designated as the type of the optical fiber, parameters including the refractive index of the single-mode fiber necessary for testing the optical transmission path 1 using the single-mode fiber are designated by the SMF parameter designation means 31b. When a multimode fiber is designated as the type of the optical fiber, parameters including the refractive index of the multimode fiber necessary for testing the optical transmission path 1 using the multimode fiber are designated by the MMF parameter designation means 31c.

In the step of obtaining and displaying the characteristic of the optical transmission path, when a single-mode fiber is designated, the transmission characteristic of the optical transmission path 1 with respect to distance is obtained on the basis of intensity data of the return light and the parameters including the designated refractive index necessary for testing the optical transmission path using the single-mode fiber and is displayed. When a multimode fiber is designated, the transmission characteristic of the optical transmission path 1 with respect to distance is obtained on the basis of intensity data of return light and the parameters including the designated refractive index necessary for testing the optical transmission path using the multimode fiber and is displayed.

Accordingly, as described above, when the test-target optical transmission path 1 is formed of an SMF, light propagates in the single mode, thereby correctly detecting failure in the long-distance transmission path. Even when the test-target optical transmission path 1 is formed of an MMF, the test parameters including the refractive index of the MMF can be exclusively set. Therefore, it is possible to perform a test of the optical transmission path using the MMF without changing hardware including an optical system.

The displaying of the transmission characteristic may include a step of obtaining a connection loss in the connection portion of the optical transmission path 1 by the connection confirmation means 37, and a step of determining whether or not the connection loss is within the allowable range set in advance. In this case, the allowable range to be used for the determination is shifted by the allowable range shift means 38 in accordance with a difference of an optical fiber to be designated. Therefore, even when there is a loss due to a difference in the core diameter, it is possible to correctly determine a connection abnormality in the connection portion of the optical transmission path.

DESCRIPTION OF REFERENCE NUMERALS AND SIGNS

1: test-target optical transmission path, 20: optical pulse test apparatus, 21: light source, 22: optical coupler, 23: connector, 25: optical receiver, 26: amplifier, 27: A/D converter, 30: signal processing unit, 31: test condition setting means, 31a: fiber type designation means, 31b: SMF parameter designation means, 31c: MMF parameter designation means, 32: data acquisition means, 33: waveform synthesis means, 34: time/distance conversion means, 35: characteristic display means, 36: event detection means, 37: connection confirmation means, 38: allowable range shift means, 40: operation unit, 50: display unit, Fa to Fc: SMF optical path

The invention claimed is:
1. An optical pulse test apparatus comprising:
a light source which emits an optical pulse;
a connector to which a test-target optical transmission path of an optical fiber is connected;
an optical receiver;
an optical coupler which receives the optical pulse emitted from the light source, emits the optical pulse to the connector, receives return light from the optical fiber through the connector, and enters return light into the optical receiver;
an operation unit;
a display unit; and
a signal processing unit which receives an output of the optical receiver, continuously acquires data regarding the intensity of the return light entering the optical receiver, obtains the transmission characteristic of the test-target optical fiber with respect to distance on the basis of data and test parameters designated by the operation unit, and displays the transmission characteristic on the display unit, wherein the light source and the optical coupler, the optical coupler and the connector, and the optical coupler and the optical receiver are respectively connected to each other by optical paths (Fa to Fc) using a single-mode fiber, the signal processing unit includes fiber type designation means for designating, based on the test parameters, the type of the test-target optical fiber as either a single-mode fiber or a multimode fiber, SMF parameter designation means for, when a single-mode fiber is designated by the fiber type designation means, designating parameters including the refractive index of the single-mode fiber, the parameters being necessary for testing an optical transmission path using the single-mode fiber, and mMF parameter designation means for, when a multimode fiber is designated by the fiber type designation means, designating parameters including the refractive index of the multimode fiber, the parameters being necessary for testing an optical transmission path using the multimode fiber, and when the single-mode fiber is designated, the transmission characteristic of the optical fiber with respect to distance is obtained on the basis of intensity data of return light and the parameters including the refractive index designated by the SMF parameter designation means, and when the multimode fiber is designated, the transmission characteristic of the optical fiber with respect to distance is obtained on the basis of intensity data of return light and the parameters including the refractive index designated by the MMF parameter designation means, wherein the signal processing unit includes connection confirmation means for obtaining a connection loss of the test-target optical fiber to the connector and for determining whether or not the connection loss is within an allowable range set in advance, and allowable range shift means for shifting the allowable range to be used for the determination by the connection confirmation means in accordance with a difference of an optical fiber designated by the fiber type designation means.

2. A method of testing an optical transmission path, the method comprising the steps of:

connecting a test-target optical transmission path of an optical fiber;

designating test parameters corresponding to the optical fiber;

emitting an optical pulse to the optical fiber;

receiving return light from the optical fiber;

continuously acquiring intensity data of the return light; and obtaining and displaying the transmission characteristic of the optical fiber with respect to distance on the basis of intensity data and the test parameters, wherein, in the step of emitting the optical pulse, the optical pulse is emitted to the optical fiber through an optical path using a single-mode fiber, in the step of receiving return light, return light is received through the optical path using the single-mode fiber, the step of designating the test parameters includes the steps of designating, based on the test parameters, the type of an optical fiber of the optical transmission path as either a single-mode fiber or a multimode fiber, when a single-mode fiber is designated as the type of the optical fiber, designating parameters including the refractive index of the single-mode fiber, the parameters being necessary for testing an optical transmission path using the single-mode fiber, and when a multimode fiber is designated as the type of the optical fiber, designating parameters including the refractive index of the multimode fiber, the parameters being necessary for testing an optical transmission path using the multimode fiber, and in the step of displaying the transmission characteristic, when the single-mode fiber is designated, the transmission characteristic of the optical fiber with respect to distance is obtained on the basis of intensity data of return light and the parameters including the designated refractive index necessary for testing the single-mode fiber and is displayed, and when the multimode fiber is designated, the transmission characteristic of the optical fiber with respect to distance is obtained on the basis of intensity data of return light and the parameters including the designated refractive index necessary for testing the multimode fiber and is displayed, wherein the step of displaying the transmission characteristic includes the steps of obtaining a connection loss at a connection portion of the optical fiber and determining whether or not the connection loss is within an allowable range set in advance, and shifting the allowable range to be used for the determination in accordance with a difference of the designated optical fiber.

* * * * *